(12) United States Patent  
Ball

(10) Patent No.: US 7,189,044 B2
(45) Date of Patent: Mar. 13, 2007

(54) LOCKING NUT AND BOLT SYSTEM WITH ENHANCED LOCKING

(75) Inventor: Loren Ball, Lloyd Harbor, NY (US)

(73) Assignee: Permanent Technologies, LLC, Lloyd Harbor, NY (US)

( * ) Notice: Subject to any disclaimer, the term of this patent is extended or adjusted under 35 U.S.C. 154(b) by 45 days.

(21) Appl. No.: 10/978,127

(22) Filed: Oct. 29, 2004

(65) Prior Publication Data

US 2006/0093459 A1   May 4, 2006

(51) Int. Cl.
*F16B 39/32* (2006.01)
(52) U.S. Cl. ................................ 411/329; 411/247
(58) Field of Classification Search ............... 411/327, 411/329, 247, 302, 521
See application file for complete search history.

(56) References Cited

U.S. PATENT DOCUMENTS

| 307,722 | A |   | 11/1884 | Klemroth |         |
|---------|---|---|---------|----------|---------|
| 439,754 | A |   | 11/1890 | Thompson |         |
| 583,369 | A | * | 5/1897  | Gregory  | 411/329 |
| 589,599 | A |   | 9/1897  | Hardy    |         |
| 591,062 | A |   | 10/1897 | Smith    |         |
| 709,433 | A |   | 9/1902  | Baughn   | 411/197 |
| 785,528 | A |   | 3/1905  | Thompson |         |
| 827,289 | A |   | 7/1906  | Bowers   |         |
| 1,019,686 | A |   | 3/1912  | Miller   |         |
| 1,020,668 | A |   | 3/1912  | Thompson |         |
| 1,086,980 | A |   | 2/1914  | Badcock  |         |
| 1,088,892 | A |   | 3/1914  | Foreman  |         |
| 1,089,159 | A |   | 3/1914  | Santarcangelo |    |
| 1,136,310 | A |   | 4/1915  | Burnett  |         |
| 1,153,898 | A |   | 9/1915  | Duckett  |         |
| 1,208,210 | A |   | 12/1916 | Purcell  |         |
| 1,221,194 | A |   | 4/1917  | Lang     |         |
| 1,226,143 | A |   | 5/1917  | Stubblefield |     |
| 1,242,689 | A | * | 10/1917 | Hazel    | 411/247 |
| 1,245,362 | A |   | 11/1917 | Lynch    |         |
| 1,278,028 | A |   | 9/1918  | Savory et al. | 411/329 |
| 1,320,865 | A |   | 11/1919 | Jankiewicz |       |
| 1,352,103 | A |   | 9/1920  | Thibert  |         |
| 1,364,553 | A |   | 1/1921  | Hilsabeck |        |
| 1,465,148 | A |   | 8/1923  | Rosenberg |        |
| 1,554,338 | A |   | 9/1925  | Duckett  |         |

(Continued)

FOREIGN PATENT DOCUMENTS

DE           28 35 675        2/1980 ................. 411/174

(Continued)

*Primary Examiner*—Flemming Saether
(74) *Attorney, Agent, or Firm*—Robert C. Kain, Jr.; Fleit Kain

(57) ABSTRACT

The locking nut and bolt system includes an elongated locking unit, mounted in a nut and operative with a specially configured groove bolt. The locking unit includes a plurality of at least three tines, asymmetrically located, which protrude tangentially and generally radially inward. The tines are radially asymmetrically disposed such that when a respective tine latches into a corresponding groove, asynchronous locking operation is achieved. When the tine is engaged in the groove, counter-rotational movement (loosening) is prohibited. In another embodiment, the locking unit has different sized edge cut-outs prohibiting the locking insert from rotating within the nut. The locking unit may also include a longitudinal split and a key and a keyway. A manufacturing process is also disclosed.

37 Claims, 5 Drawing Sheets

U.S. PATENT DOCUMENTS

| | | | |
|---|---|---|---|
| 1,703,947 A | 3/1929 | Nation | |
| 1,934,439 A | 11/1933 | Messmer | 151/29 |
| 2,106,669 A | 1/1938 | Thornton | 151/2 |
| 2,232,336 A | 2/1941 | Meersteiner | 85/47 |
| 2,301,181 A | 11/1942 | Ilsemann | 151/22 |
| 2,342,170 A | 2/1944 | Tinerman | 24/221 |
| 2,398,827 A | 4/1946 | Graham et al. | 151/14 |
| 2,484,645 A | 10/1949 | Baumle | 85/1 |
| 2,521,257 A | 9/1950 | Sample | 411/329 |
| 2,556,764 A * | 6/1951 | Maerlender | 411/299 |
| 2,771,113 A | 11/1956 | Flora | 151/11 |
| 2,834,390 A | 5/1958 | Stevens | 151/11 |
| 2,861,618 A | 11/1958 | Tinnerman | 151/41.75 |
| 3,176,747 A | 4/1965 | Walton | 151/22 |
| 3,419,057 A | 12/1968 | Hogan | 151/48 |
| 3,474,846 A | 10/1969 | Bien | 151/27 |
| 3,517,717 A | 6/1970 | Orlomoski | 151/22 |
| 3,729,757 A | 5/1973 | Wright | 10/86 A |
| 3,982,575 A | 9/1976 | Ollis, Jr. | 151/22 |
| 4,024,899 A | 5/1977 | Stewart | 151/14 R |
| 4,168,731 A | 9/1979 | Taber | 151/11 |
| 4,508,477 A | 4/1985 | Oehlke | 411/174 |
| 4,674,931 A | 6/1987 | Schwind | 411/175 |
| 4,749,318 A | 6/1988 | Bredal | |
| 4,790,703 A | 12/1988 | Wing | 411/260 |
| 4,900,208 A | 2/1990 | Kaiser | 411/387 |
| 5,020,953 A * | 6/1991 | Wada | 411/247 |
| 5,215,336 A * | 6/1993 | Worthing | 285/81 |
| 5,238,342 A * | 8/1993 | Stencel | 411/43 |
| 5,362,110 A | 11/1994 | Bynum | 285/87 |
| 5,460,468 A | 10/1995 | DiStasio | 411/329 |
| 5,538,378 A * | 7/1996 | Van Der Drift | 411/299 |
| 6,010,289 A | 1/2000 | DiStasio | |
| 6,227,782 B1 * | 5/2001 | Bowling et al. | 411/114 |
| 6,264,411 B1 | 7/2001 | DiStasio | |
| 6,679,663 B2 | 1/2004 | DiStasio | |

FOREIGN PATENT DOCUMENTS

| | | |
|---|---|---|
| FR | 1345897 | 11/1963 |
| GB | 142748 | 5/1920 |
| GB | 662298 | 12/1951 |

* cited by examiner

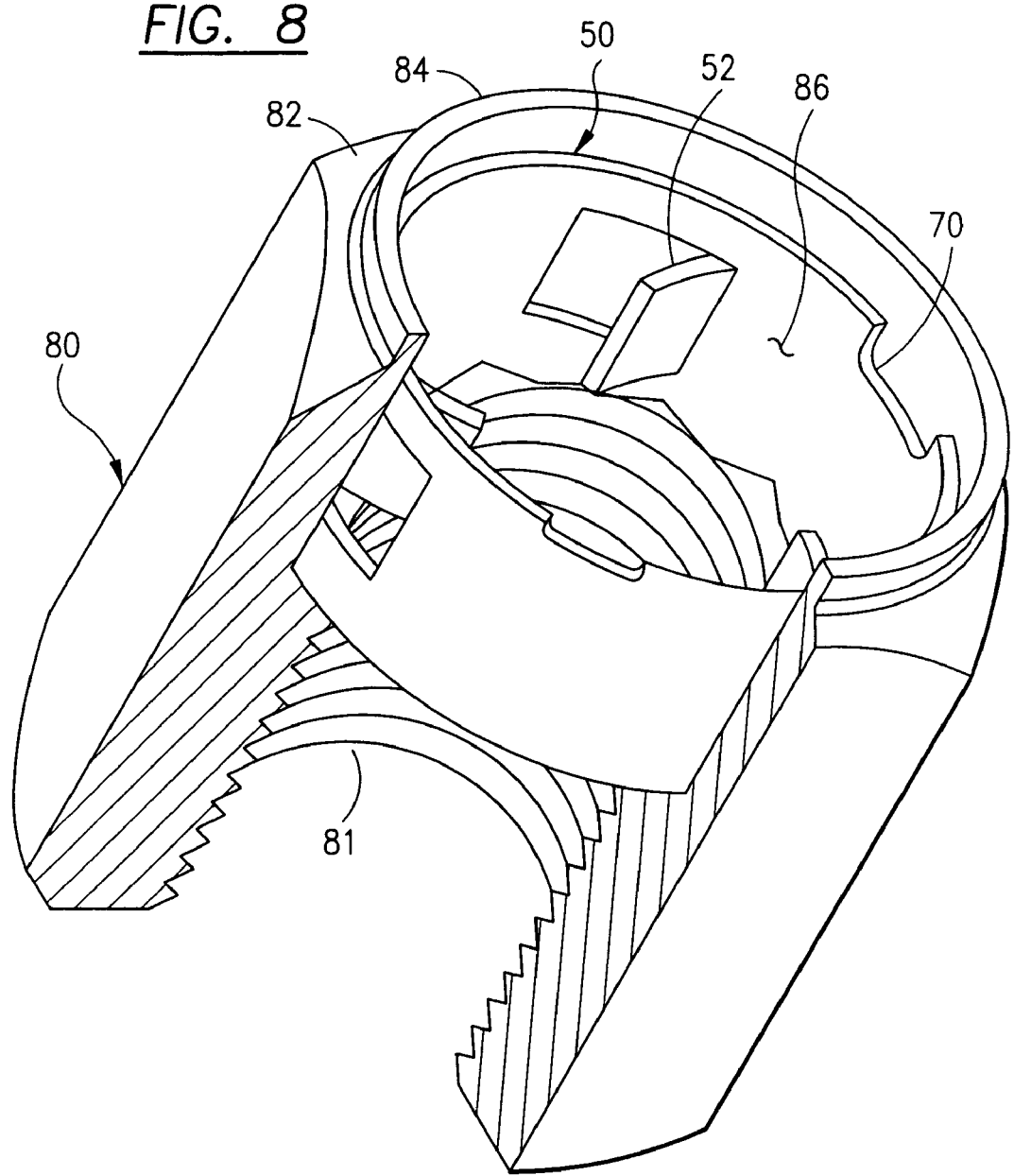

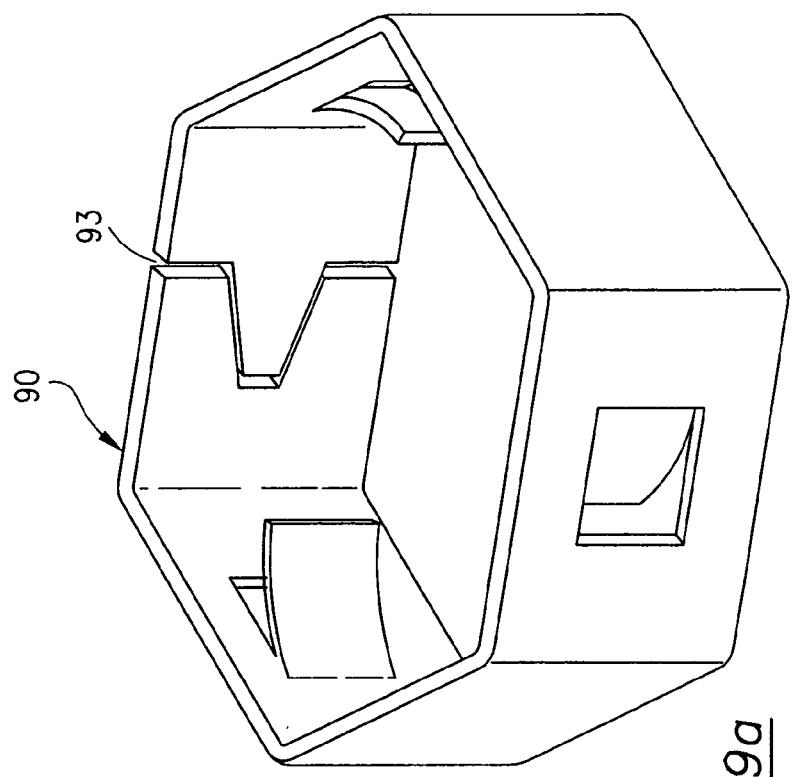
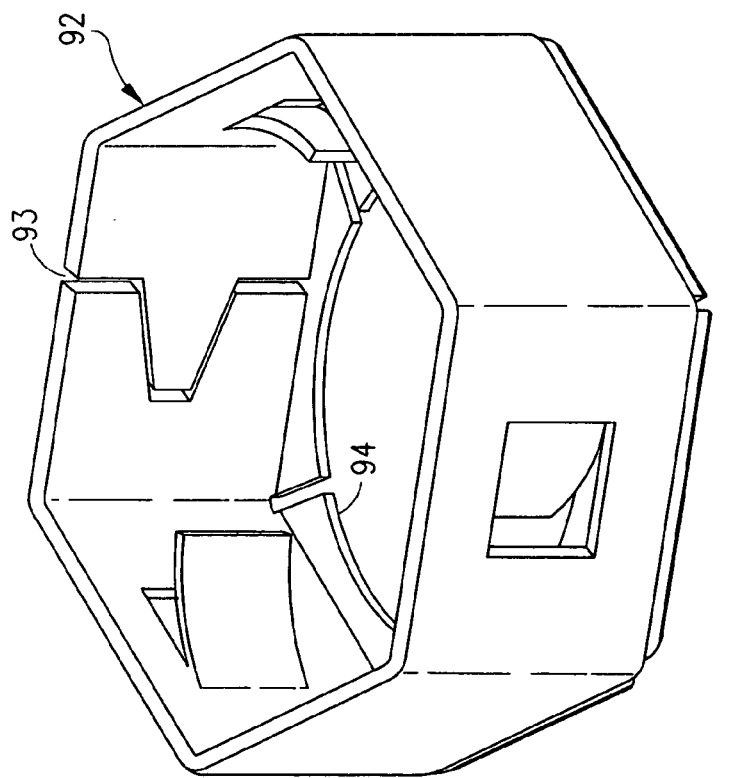

LOCKING NUT AND BOLT SYSTEM WITH ENHANCED LOCKING

The present invention relates to a locking nut and bolt system and a locking nut insert utilized in connection with a specially configured bolt to provide enhanced locking or resistance to counter-rotative motion. A manufacturing process for the locking unit insert is also disclosed.

BACKGROUND OF THE INVENTION

Nut and bolt systems typically compress elements therebetween and mount one component to another component. Sometimes, the mounted assembly is subjected to vibrations which cause counter-rotative torque on the nut and bolt such that the nut loosens on the bolt and the components forming the assembly become loose and unattached. It is helpful to have a locking nut and bolt system and a locking nut insert (operable in conjunction with a specially configured bolt) which prohibits counter-rotative movement and therefore maintains the components in a mounted or fixed assembly.

Various locking nut and bolt systems are disclosed in U.S. Pat. No. 6,010,289 to DiStasio; U.S. Pat. No. RE35,937 to DiStasio; and U.S. Pat. No. 5,951,224 to DiStasio. The content and specification of U.S. Pat. No. 6,010,289 is incorporated herein by reference thereto. U.S. Pat. No. 307,722 to Klemroth discloses bolts having grooves thereon. The following patents disclose the use of bolts carrying grooves and one or more locking tines operative with the grooves on the bolts to prevent or limit loosening of the nut and bolt: U.S. Pat. No. 1,136,310 to Burnett; U.S. Pat. No. 1,226,143 to Stubblefield; U.S. Pat. No. 2,521,257 to Sample; and U.S. Pat. No. 5,238,342 to Stencel.

OBJECTS OF THE INVENTION

It is an object of the present invention to provide a locking nut and bolt system (and a locking nut insert) wherein the locking nut insert carries a plurality of locking tines which are not radially symmetrical to each other, thereby enhancing the locking characteristic of the locking nut and bolt system.

It is a further object of the present invention to provide a locking nut and bolt system (and a locking nut insert) wherein the insert is better fixed within the nut due to half-moon cut-out edge segments.

It is a further object of the present invention to provide a locking nut and bolt system with enhanced locking features wherein the locking action of a respective tine in a corresponding bolt groove is asynchronous with respect to other tines and other grooves on the locking unit insert and the bolt, respectively.

It is a further object of the present invention to provide a locking nut insert which is longitudinally split to enhance handling and manufacturing characteristics of the locking unit insert.

SUMMARY OF THE INVENTION

The locking nut and bolt system includes a specially configured bolt operative with an elongated locking unit, which locking unit is mounted in a recess defined on an end face of a nut. The bolt carries a plurality of notches on its threads, which notches are in a predetermined pattern generally longitudinal (which may include spiral or diagonal configurations). The elongated locking unit includes a plurality of at least three tines (in one embodiment) which protrude tangentially and generally radially inward towards the axial centerline of the bolt. The tines, in one embodiment, are radially asymmetrically disposed about the axial centerline such that when a respective tine latches into a corresponding groove, asynchronous locking operation is achieved with respect to the remaining tines and grooves. When the tine falls within the groove, counter-rotational movement (suggesting a loosening of the nut and bolt) is prohibited due to abutment of the distal tine end against the lock face of the groove. In another embodiment, the elongated locking unit has half-moon cut-out edge segments that are swaged to the nut thereby prohibiting the locking unit insert from rotating within the nut recess. Further enhancements include configuring the locking unit as one of an elongated cylinder or an elongated polygonal unit having five or more sides. The elongated locking unit also includes a longitudinal split which enhances handling and manufacture of the locking unit insert. The split may be formed by interleaved surfaces which define opposing sides of the longitudinal split. A key and a keyway may also be formed on the interleaved surfaces.

BRIEF DESCRIPTION OF THE DRAWINGS

Further objects and advantages of the present invention can be found in the description of the preferred embodiments which follows and in the accompanying drawings which show:

FIG. 8 diagrammatically illustrates a perspective view of the locking unit insert placed in a nut recess prior to swaging; and FIGS. 9a and 9b diagrammatically illustrate polygonal locking inserts representing embodiments of the present invention.

DETAILED DESCRIPTION OF THE PREFERRED EMBODIMENTS

The present invention relates to a locking nut and bolt system (including a locking nut insert) with enhanced locking capabilities. A manufacturing process is also described for the locking unit insert.

Figure 1A:
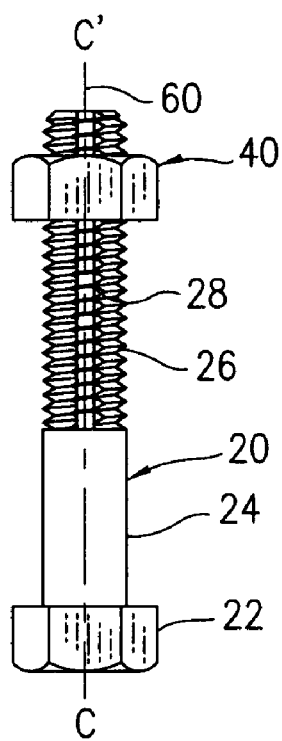
FIG. 1a diagrammatically illustrates a locking nut and bolt system with the bolt having a straight longitudinal groove thereon.

FIG. 1a diagrammatically illustrates a bolt 20 having a bolt head 22 and a bolt stem 24. Bolt 20 includes threads which include thread crests 26 and thread troughs 28. Nut 40 includes a plurality of threads which are complementary to the thread system 26, 28 on bolt stem 24. Axial centerline 60 is related to the axial centerline of the bolt 20 as well as nut 40. Axial thread end 31 is also shown in FIG. 1*a*. Reference to an outboard position of the locking nut insert (not shown in FIG. 1*a*) refers to items closer to axial thread end 31. The term "inboard" refers to items closer to bolt head 22.

Figure 1B:
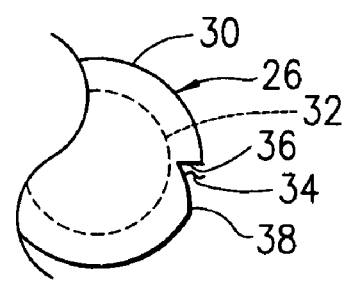
FIG. 1b diagrammatically shows a cross-sectional view of the grooved bolt.

FIG. 1*b* diagrammatically shows a cross-sectional view of grooved bolt 20. Particularly, thread crest 26 includes a generally longitudinal groove 34 thereat. Groove 34 includes a leading surface 38 and a locking surface 36. Groove 34, in a preferred embodiment, does not exceed the thread trough or root 32 of the thread system 26, 28. This feature reduces stress fractures which may occur if the groove or notch is deeper than root 32.

Figure 2A:
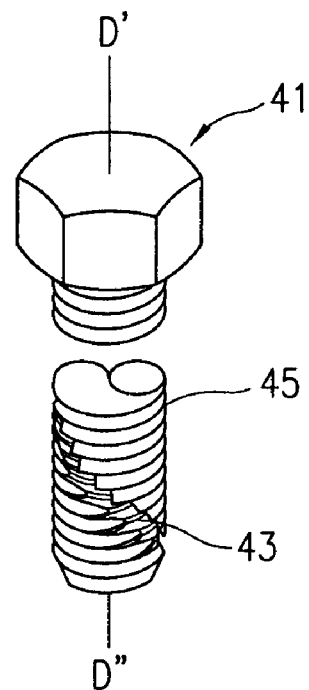
FIG. 2 diagrammatically illustrates a grooved bolt with a spiral or somewhat diagonally positioned groove or notched region.

FIG. 2 diagrammatically illustrates a diagonal or a spiral groove 43 on bolt thread 45. Axial centerline D'–D" is also shown in FIG. 2. It should be noted that bolt 20 may contain a plurality of grooves as shown in connection with bolt 20 in FIG. 5. Further, these grooves are generally longitudinally disposed in a predetermined pattern, which pattern may be limited to a portion of the longitudinal aspect of bolt 20. In FIG. 1*a*, groove 34 does not extend the entire thread portion 26, 28 of bolt 20. In other embodiments, the groove may extend the entire thread. Further, adjacent grooves formed on thread crests are generally longitudinally adjacent each other even if slightly arcuately displaced with respect to each other as shown in conjunction with the spiral groove 43 in FIG. 2.

Figure 3B:
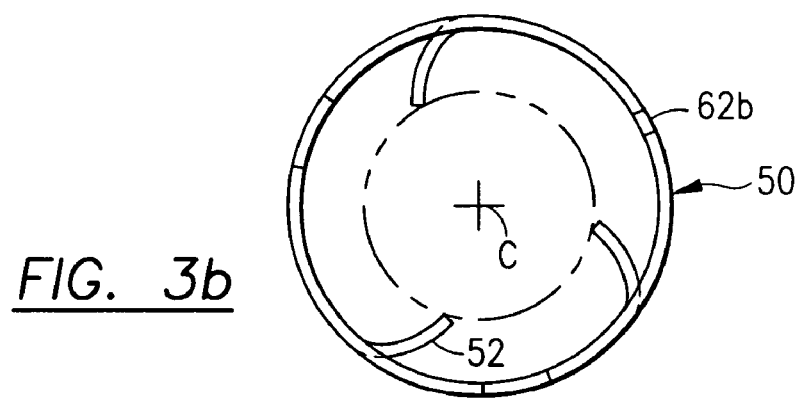
FIGS. 3a and 3b diagrammatically illustrate a perspective view of the locking unit insert and a nut thread axial end view of the locking insert, respectively.
Figure 3A:
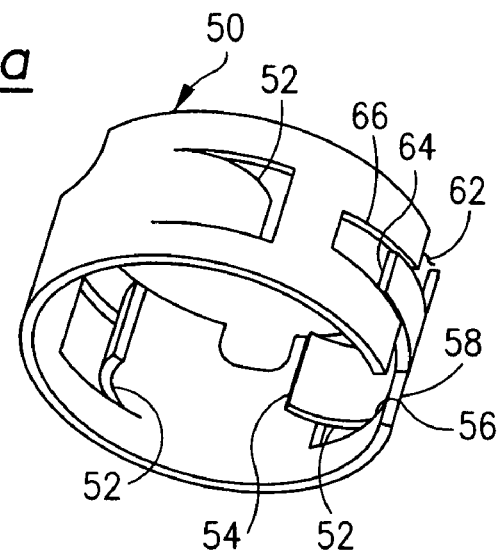

FIGS. 3*a* and 3*b* diagrammatically illustrate a perspective view and a thread end axial view of locking unit insert 50. Locking unit insert 50 is generally cylindrically shaped (but see FIG. 11*a* for a different shape) and includes a plurality of at least three tines 52 which are protruding tangentially and generally radially inward towards the axial centerline of the locking nut and bolt system. Tine 52 includes a distal tine end 54 and a proximal base region 56, which base is attached to or formed by tine wall 58. Similar numbers designate similar items throughout the figures.

Figure 4:
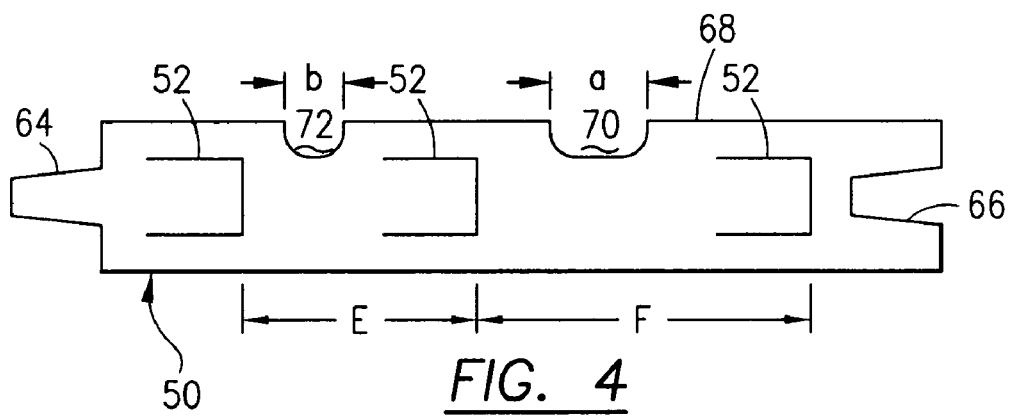
FIG. 4 diagrammatically illustrates a plan view of the locking unit insert.

As shown in FIG. 4, a plan view of locking unit insert 50, tines 52 are formed by cutting or stamping a U-shape on a strip of metal. Although metal is used in the preferred embodiment, other materials may be employed. In the preferred embodiment, locking unit insert 50 includes a longitudinal split 62 extending the axial length of unit 50. In a further enhancement, split 62 is formed by opposing sides 64, 66. In an enhancement, opposing side 64 forms a key which fits within opposite side 66 forming a keyway. In this manner, key 64 aligns with keyway 66 to form split 62. Also, the locking unit insert can be slightly compressed thereby reducing its diameter to facilitate insertion of the locking unit into a recess in the nut end face discussed later in conjunction with FIG. 10. In FIG. 3*b*, split 62 is seen as split portion 62*b*.

To manufacture locking insert 50, a flat plate is cut per the plan view in FIG. 4 including stamp-cut tines 52 and key and keyway edge surfaces 64, 66. Then the plate is rolled such that key 64 is folded into keyway 66. See FIG. 3*a*. Also, tines 52 are radially inwardly compressed or punched upward from the plate to form the radial tines. The order of plate rolling and punching tines is not critical.

To ensure that the locking unit 50 does not rotate within nut recess, the locking unit on outboard edge 68 includes at least two cut-outs 70, 72. These cut-outs are sometimes called herein different sized half-moon cut-out edge segments. Also, cut-outs may be cavities formed by any cutting or forming process. Each cut-out 70, 72 has a different arcuate length a, b, which further enhances handling of the locking unit insert 50. In addition, cut-outs 70, 72 are placed intermediate the various positions of locking tines 52. The intermediate position of the mounting lock cut-outs 70, 72 reduces stress and fatigue in the insert during use.

One aspect of the present invention is that the locking tines are radially asymmetrically disposed on locking unit 50. In other words, distance E between the left side tines 52 is different than distance F between the intermediate tine and the right side tine 52.

Figure 5:
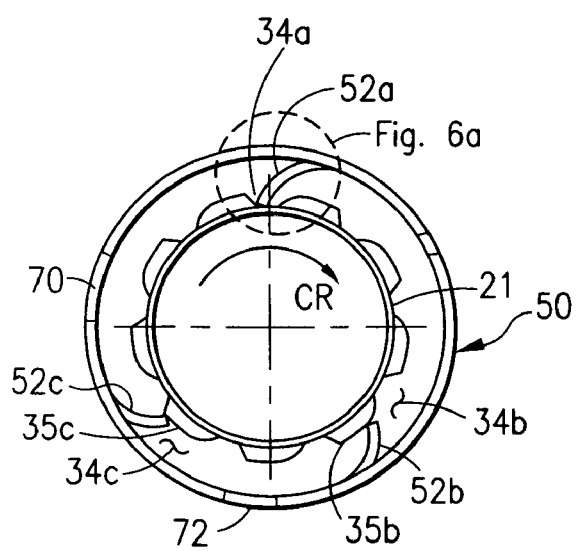
FIG. 5 diagrammatically illustrates a locking unit insert cooperating with a grooved bolt (CR denoting counter-rotative or loosening force) or direction.

FIG. 5 shows the radially asymmetrical configuration of tines 52*a*, 52*b*, and 52*c*. Further, the locking nature of tine 52*a* is asynchronous with respect to the same locking operations of tine 52*b* and tine 52*c*. In other words, when tine 52*a* locks, tines 52*b* and 52*c* are riding on thread crests or lands 35*b* and 35*c*. In a similar manner, when tine 52*b* locks in groove 34*b*, tine 52*c* is riding on crest or land 35*c*. At that time during counter-rotation CR movement of bolt 21 with respect to locking insert 50, tine 52*a* is on the adjacent left land. Current testing of the locking nut and bolt system indicates that a single tine is sufficient to prevent counter-rotative movement of bolt 21 with respect to locking nut insert 50. Therefore, radially asymmetric disposition of the tines with respect to each other about the axial centerline is adequate to lock the nut and bolt. Radially asymmetrical disposition is achieved if the arcuate distance between tines 52*a*–52*b* is different than the arcuate distance between tines 52*b* and 52*c*. In one working embodiment, the arcuate distance between tines 52*a*–52*b* is the same as the arcuate distance between tines 52*a*–52*c*, that being 106.7 degrees for a ⅜ inch bolt. However, since the arcuate distance 52*b*–52*c* is not the same as distance 52*a*–52*b* (or 52*a*–52*c*), asymmetrical positioning is achieved, resulting in the asynchronous locking of the plurality of tines in the plurality of notches. The tines are not symmetrically located about the axial centerline because 52*b*–52*c* is a different arcuate distance than 52*a*–52*b* or 52*a*–52*c*. Other asymmetrical positions may be utilized.

Figure 6A:
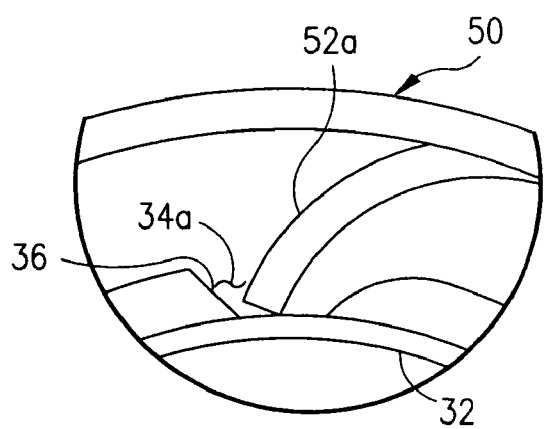
FIG. 6A diagrammatically illustrates a detail view of a tine falling into a notch in the notched or grooved bolt.

FIG. 6A diagrammatically shows that tine 52*a* is operative in a locking position in groove 34*a*. By altering the number of tines and the number of grooves and providing radially asymmetric placement of the tines about the axial centerline, locking action is achieved with a minimal rotational movement in the counter-rotational direction CR (loosening or unscrewing direction). Further, a calculation can establish the maximum unlock arcuate movement necessary before any particular tine falls and locks into a corresponding locking face 36 of a groove. This maximum unlock arcuate distance translates into the maximum seat torque load lost due to counter-rotative movement. Asymmetrical tine placement reduces seat torque load losses. Also, alternatively, asynchronous locking of one tine with respect to others reduces seat torque load losses.

A plurality of tines greater than three may be utilized in radially asymmetric positioning. A plurality of grooves or notches on the bolt thread may also be utilized.

Figure 7A:
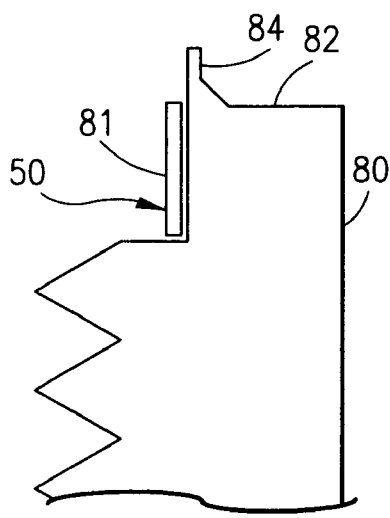
FIGS. 7a and 7b diagrammatically illustrate a portion of the nut, nut recess and a wall segment of the locking nut insert as well as the swage mount of the insert on the nut.
Figure 7B:
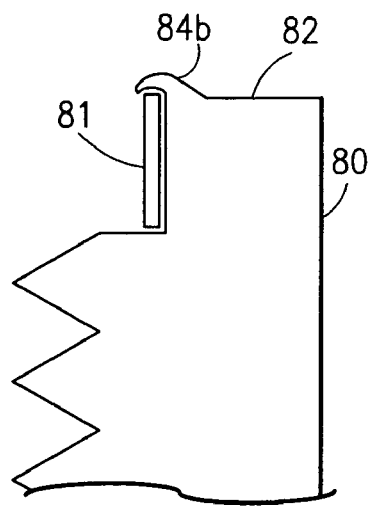

FIGS. 7*a* and 7*b* diagrammatically show a cross-section of nut 80 having a nut end face 82. FIG. 9A shows wall segment 81 of locking nut insert 50. Nut end face 82 has a small build up area 84. Build up area 84 is subsequently crushed or swaged to capture wall segment 81. The swaged area 84*b* is shown in FIG. 7*b*.

FIG. 8 diagrammatically shows locking nut insert 50 placed within recess 86 of nut 80. Build up area 84 has not been swaged upon half-moon cut-out edge segment 70 of locking nut insert 50. As is known in the art, nut threads 81 are complementary to bolt threads 26, 28 in FIG. 1*a*. The utilization of outboard cut-out edge segment 70 enables the locking nut insert 50 to be firmly locked or swaged or mounted in nut 80. The locking of the locking nut insert 50 in nut 80 is important in that the insert should not rotate when the tine falls within the corresponding groove during the prohibition of counter-rotational movement. By utilizing an inboard cut-out edge segment (not shown), additional locking forces are established for the locking nut insert.

FIGS. 9*a* and 9*b* diagrammatically show locking unit inserts 90 and 92. These inserts have longitudinal splits 93. Locking inserts 90, 92 are shaped as polygons having at least five or more sides. The polygonal shapes enhance handling of the locking nut inserts and insertion into nut recesses 86.

In FIG. 11*b*, inboard edge 94 has been crimped inward to form a radial ledge. This radial ledge may also enhance handling of the locking nut insert during manufacture. Of course, the locking nut insert is mechanically handled by machines and inserted into nut recess 86. By utilizing radial ledge 94 and detecting radial ledge 94, the locking insert 92 can be properly placed into nut recess 86. The utilization of different sized cut-outs 70, 72 shown in FIG. 4 also enhances handling since the machines can detect the edge 68 having cut-outs 70, 72 as compared with inboard edge which is opposite edge 68. Proper insertion of the locking nut inserts into nut recess 86 is important. If the locking nut inserts are placed in nut recess 86 "upside down," locking is not achieved in the counter-rotational movement direction.

The claims appended hereto are meant to cover modifications and changes within the scope and spirit of the present invention.

What is claimed is:

1. A locking nut and bolt system comprising:
a bolt having a bolt stem along and a bolt thread with thread crests and thread troughs formed on said bolt stem, said bolt having an axial centerline;
a plurality of notches defined on said bolt thread generally longitudinally in a predetermined pattern with proximal notches being generally longitudinally adjacent each other on said bolt thread, each notch having a lock face and an opposing slope;
a nut having a nut thread defined in an internal passageway and an end face, said nut thread being complementary to said bolt thread;
a recess defined on said end face of said nut below said nut end face;
an elongated locking unit with a plurality of at least three tines protruding tangentially and generally radially inward toward said axial centerline, said locking unit mounted in said nut recess, said elongated locking unit a having longitudinal split thereat;
said plurality of tines being radially asymmetrically disposed about said axial centerline, each tine having a distal tine end adapted to latch on said lock face of said notch, said asymmetric disposition of said plurality of tines resulting in asynchronous locking of said plurality of tines in said plurality of notches when a respective distal tine end of a corresponding tine moves radially inward into one of said plurality of notches and said lock face of said notch prevents counter-rotational movement of said bolt with respect to said nut when said respective distal tine end abuts said lock face; and
wherein said longitudinal split of said locking unit is formed by interleaved surfaces forming opposing edges of said longitudinal split.

2. A locking nut and bolt system as claimed in claim 1 wherein locking unit has at least one top cavity edge segment which is swaged to said nut end face.

3. A locking nut and bolt system as claimed in claim 2 wherein said plurality of notches have a depth less than said bolt thread troughs.

4. A locking nut and bolt system as claimed in claim 3 wherein said elongated locking unit is formed as one of an elongated cylinder and an elongated polygonal unit having five or more sides.

5. A locking nut and bolt system as claimed in claim 4 wherein said interleaved surfaces form a key and a keyway.

6. A locking nut and bolt system as claimed in claim 1 wherein said plurality of notches have a depth less than said bolt thread troughs.

7. A locking nut and bolt system as claimed in claim 1 wherein said elongated locking unit is formed as one of an elongated cylinder and an elongated polygonal unit having five or more sides.

8. A locking nut and bolt system as claimed in claim 1 wherein said interleaved surfaces form a key and a keyway.

9. A locking nut insert, utilized in combination with a bolt, said bolt having a bolt stem along and a bolt thread with thread crests and thread troughs formed on said bolt stem, said bolt having an axial centerline, a plurality of notches defined on said bolt thread generally longitudinally in a predetermined pattern with proximal notches being longitudinally adjacent each other on said bolt thread, each notch having a lock face and an opposing slope, a nut having a nut thread defined in an internal passageway and an end face, said nut thread being complementary to said bolt thread, and a recess defined on said end face of said nut below said nut end face, said locking nut insert comprising:
an elongated locking unit with a plurality of at least three tines protruding tangentially and generally radially inward toward said axial centerline, said locking unit mounted in said nut recess, said elongated locking unit a having longitudinal split thereat;
said plurality of at least three tines being radially asymmetrically disposed about said axial centerline, each tine having a distal tine end adapted to latch on said lock face of said notch, said asymmetric disposition of said plurality of tines resulting in asynchronous locking of said plurality of tines in said plurality of notches when a respective distal tine end of a corresponding tine moves radially inward into one of said plurality of notches and said lock face of said notch prevents counter-rotational movement of said bolt with respect to said nut when said respective distal tine end abuts said lock face; and
wherein said longitudinal split of said locking unit is formed by interleaved surfaces forming opposing edges of said longitudinal split.

10. A locking nut insert as claimed in claim 9 wherein locking unit has at least one top cavity edge segment which is swaged to said nut end face.

11. A locking nut insert as claimed in claim 10 wherein said elongated locking unit is formed as one of an elongated cylinder and an elongated polygonal unit having five or more sides.

12. A locking nut insert as claimed in claim 11 wherein said interleaved surfaces form a key and a keyway.

13. A locking nut insert as claimed in claim 9 wherein said elongated locking unit is formed as one of an elongated cylinder and an elongated polygonal unit having five or more sides.

14. A locking nut insert as claimed in claim 13 wherein said interleaved surfaces form a key and a keyway.

15. A locking nut and bolt system comprising:
a bolt having a bolt stem along and a bolt thread with thread crests and thread troughs formed on said bolt stem, said bolt having an axial centerline;
a plurality of notches defined on said bolt thread generally longitudinally in a predetermined pattern with proximal notches being longitudinally adjacent each other on said bolt thread, each notch having a lock face and an opposing slope;
a nut having a nut thread defined in an internal passageway and an end face, said nut thread being complementary to said bolt thread;
a recess defined on said end face of said nut below said nut end face;
an elongated locking unit with at least one tine protruding tangentially and radially inward toward said axial centerline, said locking unit sized to fit within said nut recess, said locking unit having at least two different sized half-moon cut-out edge segments, said tine having a distal tine end adapted to latch on said lock face of said notch;
said cut-out edge segments swaged to said nut end face; and
said distal tine end moves radially inward when said distal tine end is disposed in one or more notches and moves radially outward when said distal tine end rides on said bolt thread crest, and said lock face of said notch preventing counter-rotational movement of said bolt with respect to said nut when said distal tine end abuts said lock face.

16. A locking nut and bolt system as claimed in claim 15 wherein cut-out segments are circumferentially displaced away from said tine.

17. A locking nut and bolt system as claimed in claim 16 wherein said elongated locking unit includes a plurality of at least three tines protruding tangentially and generally radially inward toward said axial centerline, said plurality of tines being radially asymmetrically disposed about said axial centerline, said asymmetric disposition of said plurality of tines resulting in asynchronous locking of said plurality of tines in said plurality of notches when a respective distal tine end of a corresponding tine moves radially inward into one of said plurality of notches and said lock face of said notch prevents counter-rotational movement of said bolt with respect to said nut when said respective distal tine end abuts said lock face.

18. A locking nut and bolt system as claimed in claim 17 wherein said plurality of notches have a depth less than said bolt thread troughs.

19. A locking nut and bolt system as claimed in claim 18 wherein said elongated locking unit is formed as one of an elongated cylinder and an elongated polygonal unit having five or more sides, said elongated locking unit a having longitudinal split thereat.

20. A locking nut and bolt system as claimed in claim 19 wherein said longitudinal split of said locking unit is formed by interleaved surfaces forming opposing edges of said longitudinal split.

21. A locking nut and bolt system as claimed in claim 20 wherein said interleaved surfaces form a key and a keyway.

22. A locking nut and bolt system as claimed in claim 15 wherein said elongated locking unit includes a plurality of at least three tines protruding tangentially and generally radially inward toward said axial centerline, said plurality of tines being radially asymmetrically disposed about said axial centerline, said asymmetric disposition of said plurality of tines resulting in asynchronous locking of said plurality of tines in said plurality of notches when a respective distal tine end of a corresponding tine moves radially inward into one of said plurality of notches and said lock face of said notch prevents counter-rotational movement of said bolt with respect to said nut when said respective distal tine end abuts said lock face.

23. A locking nut and bolt system as claimed in claim 15 wherein said plurality of notches have a depth less than said bolt thread troughs.

24. A locking nut and bolt system as claimed in claim 15 wherein said elongated locking unit is formed as one of an elongated cylinder and an elongated polygonal unit having five or more sides, said elongated locking unit a having longitudinal split thereat.

25. A locking nut and bolt system as claimed in claim 24 wherein said longitudinal split of said locking unit is formed by interleaved surfaces forming opposing edges of said longitudinal split.

26. A locking nut and bolt system as claimed in claim 25 wherein said interleaved surfaces form a key and a keyway.

27. A locking nut insert, utilized in combination with a bolt, said bolt having a bolt stem along and a bolt thread with thread crests and thread troughs formed on said bolt stem, said bolt having an axial centerline, a plurality of notches defined on said bolt thread generally longitudinally in a predetermined pattern with proximal notches being longitudinally adjacent each other on said bolt thread, each notch having a lock face and an opposing slope, a nut having a nut thread defined in an internal passageway and an end face, said nut thread being complementary to said bolt thread, and a recess defined on said end face of said nut below said nut end face, said locking nut insert comprising:
an elongated locking unit having an axial centerline co-extensive with said bolt axial centerline, said locking unit having at least one tine protruding tangentially and radially inward toward said axial centerline, said locking unit sized to fit within said nut recess, said locking unit having at least two different sized half-moon cut-out edge segments, said tine having a distal tine end adapted to latch on said lock face of said notch; and
said edge segments adapted to be swaged to said nut end face.

28. A locking nut insert as claimed in claim 27 wherein said edge segments are displaced away from said tines.

29. A locking nut insert as claimed in claim 28 wherein said elongated locking unit includes a plurality of at least three tines protruding tangentially and generally radially inward toward said axial centerline, said plurality of tines being radially asymmetrically disposed about said axial centerline, said asymmetric disposition of said plurality of tines resulting in asynchronous locking of said plurality of tines in said plurality of notches when a respective distal tine end of a corresponding tine moves radially inward into one of said plurality of notches and said lock face of said notch prevents counter-rotational movement of said bolt with respect to said nut when said respective distal tine end abuts said lock face.

30. A locking nut insert as claimed in claim 29 wherein said plurality of notches have a depth less than said bolt thread troughs.

31. A locking nut insert as claimed in claim 30 wherein said elongated locking unit is formed as one of an elongated cylinder and an elongated polygonal unit having five or more sides, said elongated locking unit a having longitudinal split thereat.

32. A locking nut insert as claimed in claim 31 wherein said longitudinal split of said locking unit is formed by interleaved surfaces forming opposing edges of said longitudinal split.

33. A locking nut insert as claimed in claim 32 wherein said interleaved surfaces form a key and a keyway.

34. A locking nut insert as claimed in claim 27 wherein said elongated locking unit includes a plurality of at least three tines protruding tangentially and generally radially inward toward said axial centerline, said plurality of tines being radially asymmetrically disposed about said axial centerline, said asymmetric disposition of said plurality of tines resulting in asynchronous locking of said plurality of tines in said plurality of notches when a respective distal tine end of a corresponding tine moves radially inward into one of said plurality of notches and said lock face of said notch prevents counter-rotational movement of said bolt with respect to said nut when said respective distal tine end abuts said lock face.

35. A locking nut insert as claimed in claim 27 wherein said elongated locking unit is formed as one of an elongated cylinder and an elongated polygonal unit having five or more sides, said elongated locking unit a having longitudinal split thereat.

36. A locking nut insert as claimed in claim 35 wherein said longitudinal split of said locking unit is formed by interleaved surfaces forming opposing edges of said longitudinal split.

37. A locking nut insert as claimed in claim 36 wherein said interleaved surfaces form a key and a keyway.

* * * * *